Figure 1:
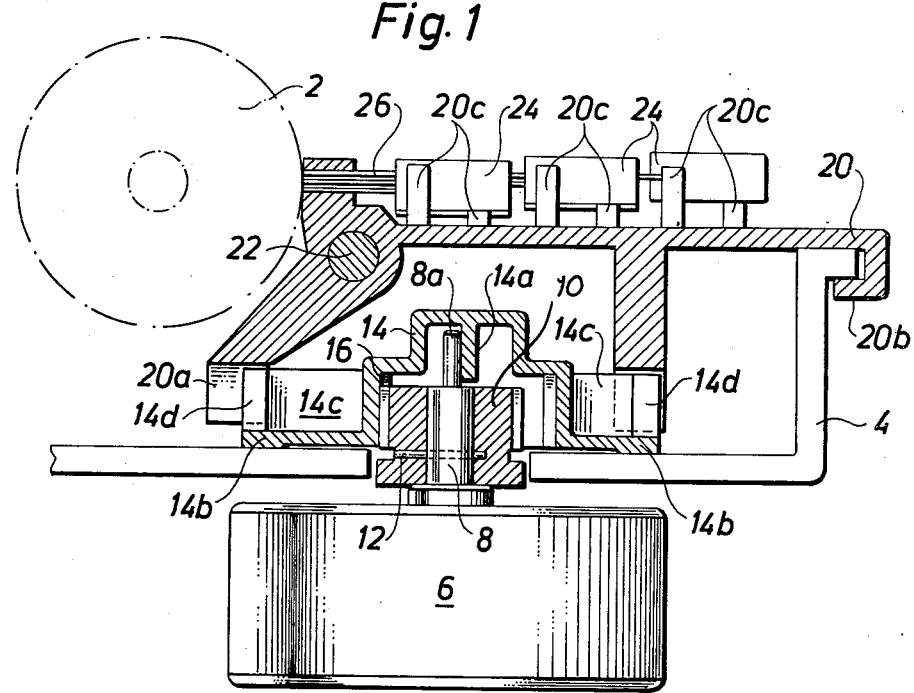

United States Patent [19]

Englund

[11] 4,112,840
[45] Sep. 12, 1978

[54] DRIVING DEVICE FOR A PRINT HEAD

[75] Inventor: Gösta Roland Englund, Stockholm, Sweden

[73] Assignee: Svenska Dataregister Aktiebolag, Sweden

[21] Appl. No.: 697,187

[22] Filed: Jun. 17, 1976

[30] Foreign Application Priority Data

Jun. 30, 1975 [SE] Sweden .............................. 7507468

[51] Int. Cl.² ............................................. B41J 9/04
[52] U.S. Cl. .................................... 101/93.15; 74/30; 400/323
[58] Field of Search ............... 101/93.15, 93.16, 93.17; 197/1 R, 82, 89; 74/25, 26, 27, 28–29, 30, 31–32, 37, 52; 346/162

[56] References Cited

U.S. PATENT DOCUMENTS

| 850,930 | 4/1907 | Hannah | 74/30 |
|---|---|---|---|
| 1,623,490 | 4/1927 | Nitchie | 74/30 |
| 1,784,842 | 12/1930 | Lemons | 74/30 |
| 2,821,861 | 2/1958 | Dunn | 74/30 |
| 3,331,317 | 7/1967 | Helteix | 101/93.15 |
| 3,476,044 | 11/1969 | Hassermann | 101/93.15 |
| 3,826,915 | 7/1974 | Giolitti et al. | 346/162 X |
| 3,966,035 | 6/1976 | Erickson | 197/1 R |

Primary Examiner—Edward M. Coven
Attorney, Agent, or Firm—Robert F. Rotella; Norman Friedman; William L. Muckelroy

[57] ABSTRACT

A driving device for a print head including printing mechanism actuated at predetermined times for marking characters on a data carrier carried by a print roll, comprising motion converting mechanism comprising a housing including an interior continuous gear path, said housing being coupled to said print head; said gear path comprising a pair of opposing straight path portions substantially parallel to the axis of said print roll; said straight path portions being joined, at each end thereof, by respective curved path portions; rotatable pinion mechanism in continual engagement with said gear path; said pinion mechanism being coupled to the shaft of a motor driving mechanism; said straight path portions being mutually separated by a distance greater than the outside diameter of said pinion mechanism and said curved path portions being mutually separated by a distance substantially greater than the distance separating said straight path portions; rotary motion of said pinion mechanism being converted to reciprocating movement of said housing and corresponding movement of said print head; said housing and said print head being coupled by guide mechanism; said guide mechanism permitting movement of said housing and said print head in a direction substantially parallel to the axis of said print roll whenever said pinion engages said straight path portions and said guide mechanism allowing movement of said housing and said print head in a direction substantially perpendicular to the axis of said print roll whenever said pinion engages said curved path portions; whereby the tendency of said housing to rotate about the axis of said pinion, whenever said pinion engages said curved path portions, is eliminated by said guide mechanism.

4 Claims, 2 Drawing Figures

DRIVING DEVICE FOR A PRINT HEAD

The present invention relates to a driving device for a print head.

A large number of devices are known for driving print heads carrying printing means which are actuated at pre-determined times for printing characters on a data carrier carried by a print roll extending in the direction of movement of the print head. Such a device is described in the U.S. Pat. No. 3,826,915 where the print head carries a carriage provided with a channel including internal gears in the form of a closed loop. A motor is provided with a pinion which via further gears, a pivotable plate and several pins engages in the loop to drive it, and thereby the print head rigidly attached to the carriage, along the roller. The greatest drawback with this device is that a large number of details are required for transmitting the driving movement from the motor to the print head. More exactly, there are required five details in motion with each other for the transmission, which results in that the device becomes complicated and therefore expensive to manufacture and maintain. Furthermore, the risk of operational disturbances and breakdowns is increased.

Through other publications it is also known to convert a rotating movement to a linear movement by using a pinion connected to a motor shaft and engaging with a motion converting means provided with an internal gear path, the means obtaining a linear movement when the pinion is rotated. Examples of such devices are to be found in the French patent specification No. 2,187,068, the U.S. Pat. No. 1,623,490, German patent specification No. 34,261 and the British patent specification Nos. 29, 195/1910 and 17, 503/1913. All these devices are, however, used in completely different applications, and for varying reasons they are not suitable for driving a print head. Furthermore, the devices contain a large number of details for driving the motion converting means or for coupling it with the means which carries out the reciprocating movement. In the case where any of the devices contain means for controlling the movement component which necessarily must occur when the movement of the motion converting means is reversed, said movement component being directed at right angles to the latter movement, these means are complicated and require a plurality of separate details or they are so designed or adapted that they interfere with the reciprocating movement.

It is therefore an object of the invention to provide a driving device for a print head which is not burdened with the drawbacks inherent in previously known devices and which is very simply constructed, contains very few separate details, is cheap and easy to manufacture, is reliable, requires a minimum of maintenance and achieves very rapid movement of the print head along the print roll without any notable time being lost in reversing the direction of movement.

These objects are fulfilled in that the motion converting means and the print head are provided with respective guiding means engaging each other, which couple together the motion converting means and the print head for common motion along the roll when the rotatable pinion rigidly attached to the motor shaft engages with either of the first paths of the motion converting means and which allows the displacement of the motion converting means substantially at right angles to the roll when the pinion engages with either of the second paths of the motion converting means.

A preferred embodiment of the invention will now be described while referring to the appended drawings on which FIG. 1 is a side view partly in section of the driving device according to the invention.

Figure 2:
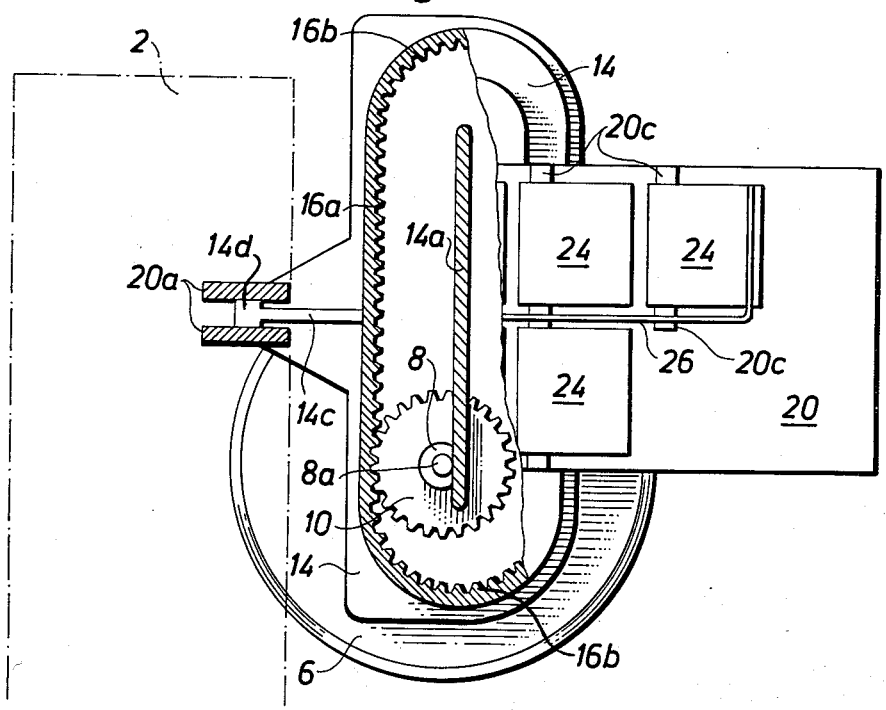

FIG. 2 is a view seen from above of the driving device according to FIG. 1 with certain parts cut away.

The printing shown in the Figures comprises a print roll 2 which is rotatably mounted in a frame a part 4 of which is shown in FIG. 1. An electric motor 6 is also attached to the frame and on its drive shaft 8 there is attached a pinion 10 with the aid of locking means 12. The pinion 10 is introduced through a hole in the bottom of the frame portion 4 and engages with a motion converting means in the form of a box-shaped means 14 provided with a continuous gear path 16, and which in the following is termed "box". The gear path 16 comprises two straight paths 16a and two generally semi-circular paths 16b joining the paths 16a. The distance between the two straight paths 16a is slightly larger than the outside diameter of the pinion wheel, so that when the pinion wheel 10 engages with one straight path 16, the other straight path 16a is at a distance from the pinion. The length of the two straight paths 16a is dependent on the line length which is desired to be printed on a data carrier such as a calculation strip or a receipt (not shown) placed on the print roll.

An extension 8a of the shaft 8, provided with a small diameter, engages continually with a vertical wall 14a extending downward from the bottom of the box 14 which is turned upside-down. The wall 14a is centrally situated in the box 14 and extends parallel to the straight gear paths 16a substantially for the whole of their length. The distance between either end of the wall 14a and the top tooth lands of the adjacent semicircular gear path 16b is generally the same as the distance between the wall and the top tooth lands of a straight gear path 16a, the latter distance being generally the same as the distance, perpendicular to the wall, between the engaging surface of the shaft extension 8a with the wall and the bottom tooth land of the pinion.

The box 14 which as a whole is manufactured form a hard plastic material is also provided with a pair of flanges 14b integral with the box, the flanges only engaging with a portion of their lower surfaces against the upper side of the frame portion 4 so that the friction between the box and the frame portion will be as small as possible when the box is shifted in any of four different directions. From the flanges 14b and from the side walls of the box extend two upwardly directed projections 14c, made integral with the box, the projections each being provided at their extremities with a boss 14d, and each boss coacts with a pair of dependent projections 20a constituting portions of a saddle 20 which may be said to constitute a portion of the print head of the device. The projections 20a are at a mutual distance insignificantly exceeding the width of a boss 14d. Each time the direction of movement of the box 14 along the roll 2 is reversed, i.e. when the pinion 10 goes from engagement with the straight gear path 16a to the other straight gear path 16a via one of the semi-circular paths 16b, the box 14 is given a sideways movement perpendicular to the roll 2, because the box is guided by the projections 20a via the bosses 14d on its own projections 14c. If this sideways guidance were not available, the box 14 would turn uncontrollably around either axis parallel with the shaft 8, and its function as a movement transfer means would cease or in any case be reduced.

The saddle 20 consists of a slab made in hard plastic with downwardly directed portions two portions of which are provided with the projections 20a and a third portion of which consists of a piece 20b folded round a portion of the frame. The saddle 20 is kept at a predetermined constant distance from the roll 2 partly by means of the piece 20b and partly by means of a shaft 22 attached to the frame. The saddle is mounted for movement on the shaft 22 and on the frame portion 4 (at 20b) along the roll 2. When thus the box 14 is given a linear movement along the roll 2 by the pinion 10 the box urges the saddle 20 via the co-acting parts 14d and 20a, whereat the saddle carries out the desired movement.

The saddle 20 is also provided with upwardly directed projections 20c to which solenoids 24 are attached. The solenoids 24 coact with wires or needles 26 which are supported by certain of the projections 20c in the front portion of the saddle. When selected solenoids are energised, when the saddle assumes certain predetermined positions along the roll, the associated needles are moved into engagement with the data carrier placed on the roll, the data carrier thereby being provided with combinations of dots forming different characters.

It should have become apparent from the above description that a very simple and operationally reliable device has been provided for driving a print head. Accordingly, the device comprises only two details for transforming the rotary movement of the motor shaft to the reciprocating linear movement executed by the print head, namely the pinion 10 and the box 14 manufactured in one piece, whereat the connection between the box and the print head (the saddle 20) is provided by guiding means respectively integral with the box and the print head.

Even if only one embodiment of the invention has been described above and shown on the drawings, it should be understood that a plurality of modifications of this embodiment are possible within the scope of the invention, which is only limited by the following claims.

I claim:

1. A driving device for a print head including printing means actuated at predetermined times for marking characters on a data carrier carried by a print roll, comprising:
    motion converting means comprising a housing including an interior continuous gear path;
    said housing being coupled to said print head;
    said gear path comprising a pair of opposing straight path portions substantially parallel to the axis of said print roll; said straight path portions being joined, at each end thereof, by respective curved path portions;
    rotatable pinion means in continual engagement with said gear path;
    said pinion means being coupled to the shaft of a motor driving means;
    said straight path portions being mutually separated by a distance greater than the outside diameter of said pinion means and said curved path portions being mutually separated by a distance substantially greater than the distance separating said straight path portions;
    rotary motion of said pinion means being converted to reciprocating movement of said housing and corresponding movement of said print head;
    said housing and said print head being coupled by guide means comprising a guided member joined to said housing and a guiding member joined to said print head;
    said guided member comprising at least a pair of projections extending substantially perpendicular to said straight path portions and said guiding member comprising at least a pair of channels, each one receiving a respective projection;
    said projections being capable of relative movement within said respective channel in a direction perpendicular to said straight path portions and said channels preventing relative movement with respect to its respective projection in a direction parallel to said straight path portions;
    said guide means permitting movement of said housing and said print head in a direction substantially parallel to the axis of said print roll whenever said pinion engages said straight path portions and
    said guide means allowing movement of said housing in a direction substantially perpendicular to the axis of said print roll whenever said pinion engages said curved path portions.

2. A print head driving device as set forth in claim 1, wherein:
    each projection is located substantially at the midpoint of a respective straight path portion.

3. A print head driving device as set forth in claim 1, wherein:
    each projection is provided at its extremity with an enlarged portion.

4. A print head driving device as set forth in claim 1, wherein:
    a portion of said housing is in sliding contact with a fixed frame member.

* * * * *